United States Patent
Youk et al.

(10) Patent No.: US 12,343,774 B2
(45) Date of Patent: Jul. 1, 2025

(54) REACTOR CLEANING METHOD

(71) Applicant: LG Chem, Ltd., Seoul (KR)

(72) Inventors: Kyung Seog Youk, Daejeon (KR); Jong Hun Song, Daejeon (KR); Hong Min Lee, Daejeon (KR); Moon Sub Hwang, Daejeon (KR); Jeong Seok Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 18/028,142

(22) PCT Filed: Jul. 25, 2022

(86) PCT No.: PCT/KR2022/010915
§ 371 (c)(1),
(2) Date: Mar. 23, 2023

(87) PCT Pub. No.: WO2023/058865
PCT Pub. Date: Apr. 13, 2023

(65) Prior Publication Data
US 2024/0293852 A1    Sep. 5, 2024

(30) Foreign Application Priority Data

Oct. 8, 2021  (KR) ........................ 10-2021-0133998
Jul. 1, 2022  (KR) ........................ 10-2022-0081252

(51) Int. Cl.
*B08B 9/08* (2006.01)
*B01J 19/24* (2006.01)
*B08B 9/093* (2006.01)

(52) U.S. Cl.
CPC ................. *B08B 9/08* (2013.01); *B01J 19/24* (2013.01); *B08B 9/0813* (2013.01); *B08B 9/093* (2013.01);
(Continued)

(58) Field of Classification Search
CPC ............ B08B 9/08–46; B08B 9/00–46; B08B 5/00–046; B08B 3/00–14; C11D 2111/20
See application file for complete search history.

(56) References Cited

U.S. PATENT DOCUMENTS 6,380,451 B1 *  4/2002  Kreischer ................ C07C 2/08
585/502
2010/0206334 A1   8/2010  Fritz et al.
(Continued)

FOREIGN PATENT DOCUMENTS

CN    212976211 U     4/2021
DE    3637060 A1 *   5/1988
(Continued)

OTHER PUBLICATIONS

International Search Report for Application No. PCT/KR2022/010915 mailed Oct. 25, 2022, pp. 1-3. [See p. 2, categorizing the cited references].
(Continued)

*Primary Examiner* — Michael E Barr
*Assistant Examiner* — Richard Z. Zhang
(74) *Attorney, Agent, or Firm* — Lerner David LLP (57) ABSTRACT

A reactor cleaning method includes pressurizing a washing solvent container to 5 kg/cm$^2$·g to 40 kg/cm$^2$·g using pressurized gas; supplying a washing solvent stream from the washing solvent container to one or more of a lower portion or a side portion of the reactor to fill an inside of the reactor; and circulating the washing solvent stream between the washing solvent container and the reactor while maintaining a temperature of the reactor at 115° C. to 200° C.

12 Claims, 4 Drawing Sheets

(52) U.S. Cl.
CPC ....... *B08B 2209/08* (2013.01); *C11D 2111/20* (2024.01)

(56) References Cited

U.S. PATENT DOCUMENTS

| | | |
|---|---|---|
| 2011/0073138 A1 | 3/2011 | Schulte et al. |
| 2018/0179122 A1 | 6/2018 | Boutrot et al. |
| 2020/0030860 A1* | 1/2020 | Andersen ............... B01F 27/191 |
| 2022/0055081 A1 | 2/2022 | Hwang et al. |

FOREIGN PATENT DOCUMENTS

| | | | |
|---|---|---|---|
| JP | H08010726 | A | 1/1996 |
| JP | 2001087724 | A | 4/2001 |
| JP | 3879920 | B2 | 2/2007 |
| JP | 2009504808 | A | 2/2009 |
| JP | 2013170135 | A | 9/2013 |
| JP | 5938934 | B2 | 6/2016 |
| KR | 20130064967 | A | 6/2013 |
| KR | 101324897 | B1 | 11/2013 |
| KR | 20180073501 | A | 7/2018 |
| KR | 20210061074 | A | 5/2021 |
| KR | 20210072402 | A | 6/2021 |
| WO | 2012072178 | A1 | 6/2012 |
| WO | 2017115206 | A1 | 7/2017 |
| WO | WO2023036767 | A1 * | 3/2023 |

OTHER PUBLICATIONS

Extended European Search Report including Written Opinion for Application No. 22865932.2 dated Mar. 1, 2024, pp. 1-7.

* cited by examiner

REACTOR CLEANING METHOD

CROSS-REFERENCE TO RELATED APPLICATIONS

The present application is a national stage entry under 35 U.S.C. § 371 of International Application No. PCT/KR2022/010915 filed on Jul. 25, 2022, which claims the benefit of priority to Korean Patent Applications No. 10-2021-0133998, filed on Oct. 8, 2021, and No. 10-2022-0081252, filed on Jul. 1, 2022, all the disclosures of which are incorporated herein by reference.

TECHNICAL FIELD

The present invention relates to a reactor cleaning method, and more particularly, to a reactor cleaning method for oligomerization of ethylene.

BACKGROUND ART

Alpha olefin is widely used commercially as an important material used as a comonomer, a detergent, a lubricant, a plasticizer, and the like. In particular, 1-hexene and 1-octene has been widely used as a comonomer for controlling a density of polyethylene in a production of linear low-density polyethylene (LLDPE).

Alpha olefins such as 1-hexene and 1-octene are typically prepared through oligomerization reaction of ethylene. The oligomerization reaction of ethylene is performed by an oligomerization reaction (trimerization reaction or tetramerization reaction) of ethylene in the presence of a catalyst using ethylene as a reactant. A reaction product generated through the reaction is a multi-component hydrocarbon mixture containing the desired 1-hexene and 1-octene and a small amount of polymer produced as a by-product during a catalytic reaction. The polymer is suspended in a liquid reaction medium in a reactor, and is accumulated in the reactor to a certain thickness due to a fouling phenomenon over time, so an operation of the reactor should be stopped and the reactor and reactor auxiliary equipment should be washed.

DISCLOSURE

Technical Problem

The present invention provides a method of improving a washing rate in washing a polymer accumulated in an oligomerization reactor of ethylene.

Technical Solution

In one general aspect, a reactor cleaning method includes: pressurizing a washing solvent container to 5 kg/cm$^2$·g to 40 kg/cm$^2$·g using pressurized gas; supplying a washing solvent stream from the washing solvent container to one or more of a lower portion or a side portion of the reactor to fill an inside of the reactor; and circulating the washing solvent stream between the washing solvent container and the reactor while maintaining a temperature of the reactor at 115° C. to 200° C.

Advantageous Effects

According to a reactor cleaning method of the present invention, it is possible to improve a washing rate of a reactor by controlling operating conditions of a washing solvent container and the reactor and improving a washing method in order to remove a polymer accumulated in the reactor by circulating a washing solvent stream between the washing solvent container and the reactor.

BEST MODE

Terms and words used in the present specification and claims are not to be construed as a general or dictionary meaning but are to be construed as meaning and concepts meeting the technical ideas of the present invention based on a principle that the inventors can appropriately define the concepts of terms in order to describe their own inventions in best mode.

In the present invention, the term 'stream' may mean a flow of a fluid in a process, and may also mean a fluid itself flowing in a moving line (pipe). Specifically, the 'stream' may mean both the fluid itself and the flow of the fluid flowing within the pipe connecting each device. In addition, the fluid may include any one or more components of a gas, a liquid, or a solid.

Figure 1:
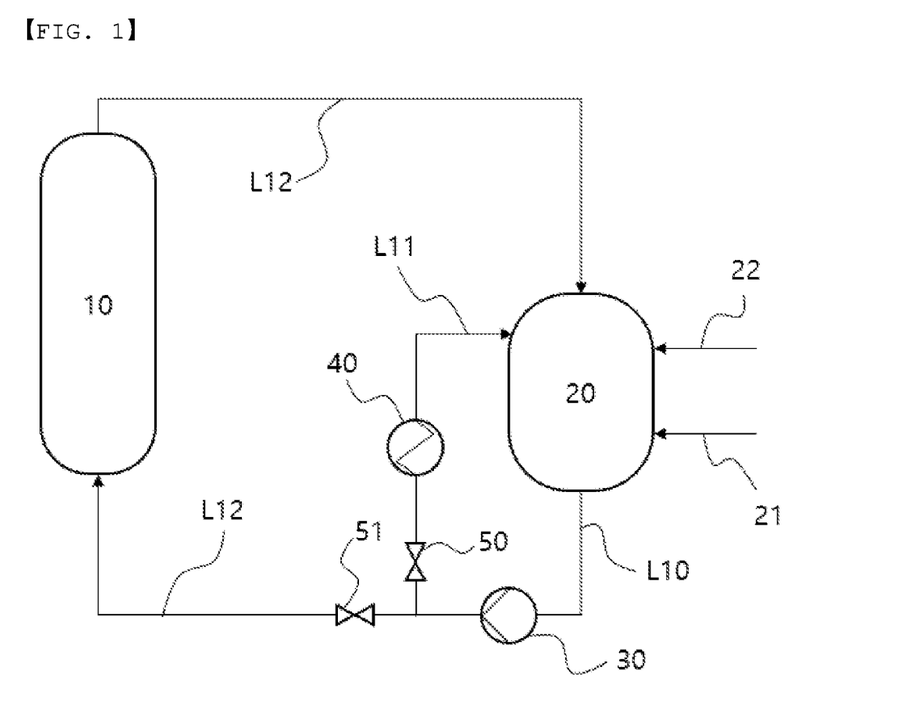
FIGS. 1 to 3 each are process flow diagrams of a reactor cleaning method according to an embodiment of the present invention, respectively.
Figure 2:
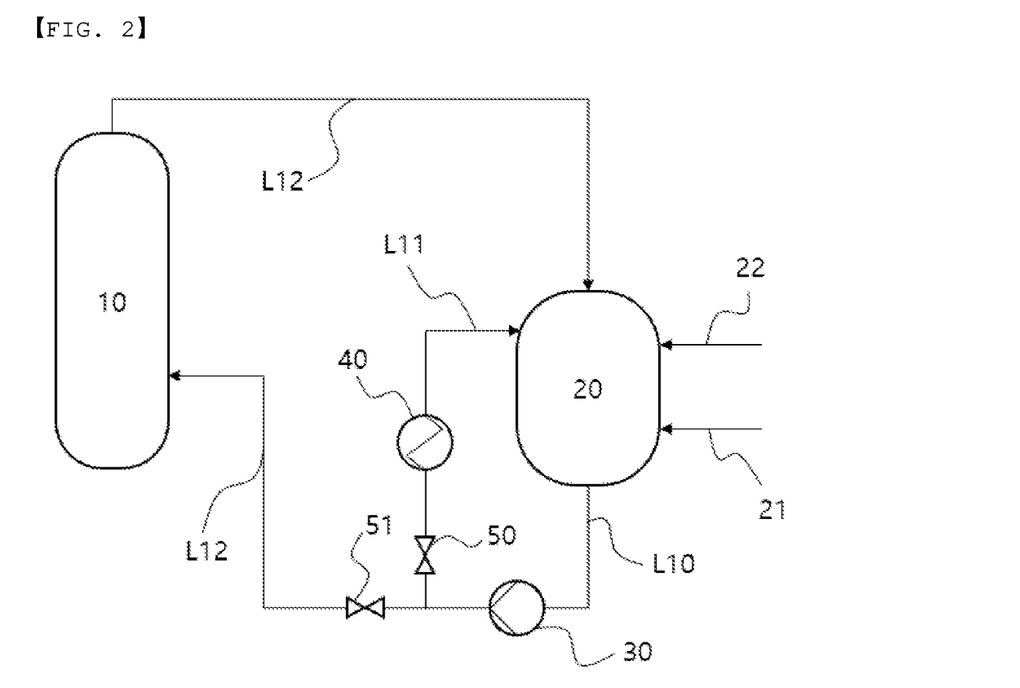
Figure 3:
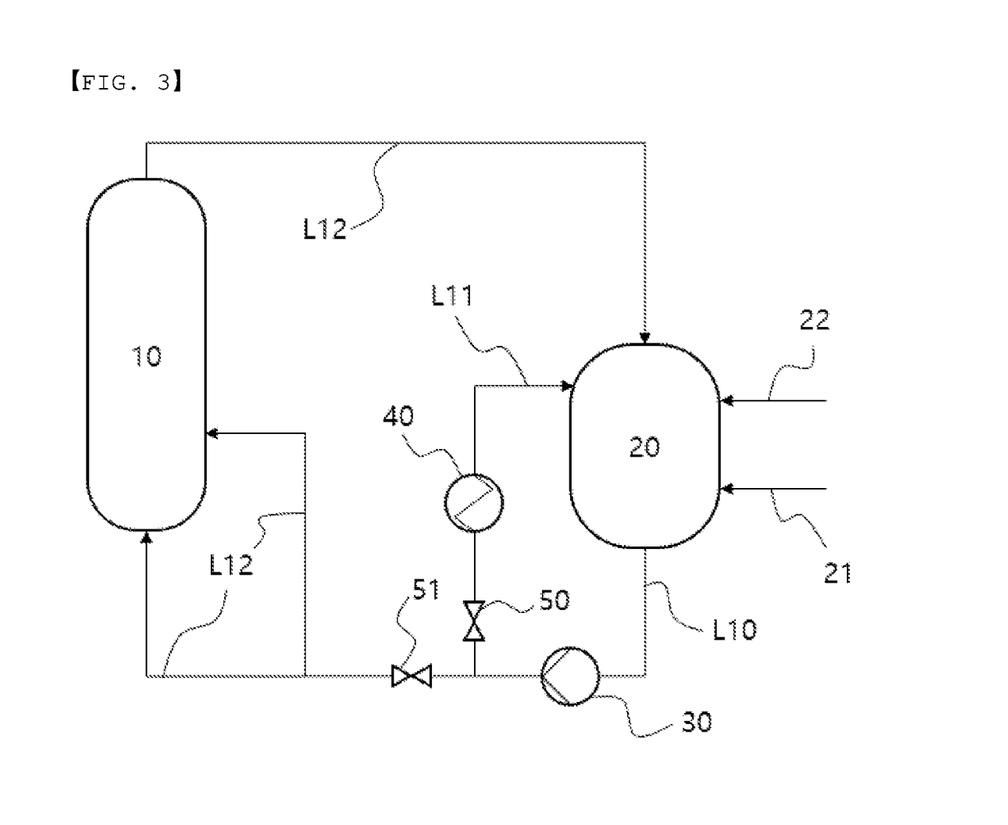

Hereinafter, the present invention will be described in more detail with reference to FIGS. 1 to 3 to help the understanding of the present invention.

According to the present invention, a reactor cleaning method is provided. The reactor cleaning method includes: pressurizing a washing solvent container to 5 kg/cm$^2$·g to 40 kg/cm$^2$·g using pressurized gas; supplying a washing solvent stream from the washing solvent container to one or more of a lower portion or a side portion of the reactor 10 to fill an inside of the reactor 10; and circulating the washing solvent stream between the washing solvent container and the reactor 10 while maintaining a temperature of the reactor 10 at 115° C. to 200° C.

According to an embodiment of the present invention, the reactor 10 may be an oligomerization reactor of ethylene. Specifically, alpha olefin is widely used commercially as an important material used as a comonomer, a detergent, a lubricant, a plasticizer, and the like. In particular, 1-hexene and 1-octene has been widely used as a comonomer for controlling a density of polyethylene in a production of linear low-density polyethylene (LLDPE), and the alpha olefin may be prepared through oligomerization reaction of ethylene.

The oligomerization reaction of ethylene may be performed by a trimerization reaction or a tetramerization reaction of ethylene in the presence of a catalyst and a cocatalyst using ethylene as a reactant.

The oligomerization reaction may refer to a reaction in which a monomer is oligomerized. Depending on the number of monomers to be polymerized, trimerization and tetramerization are called, and these trimerization and tetramerization are collectively called multimerization.

The catalyst used for the oligomerization reaction of ethylene may include a transition metal supply source. The transition metal supply source may be a compound containing one or more selected from the group consisting of, for example, chromium (III) acetylacetonate, chromium (III) chloride tetrahydrofuran, chromium (III) 2-ethylhexanoate, chromium (III) tris(2,2,6,6-tetramethyl-3,5-heptanedionate), chromium (III) benzoylacetonate, chromium (III) hexafluoro-2,4-pentaindionate, chromium (III) acetate hydroxide, chromium (III) acetate, chromium (III) butyrate, chromium (III) pentanoate, chromium (III) laurate, and chromium (III) stearate.

The cocatalyst may include one or more selected from the group consisting of, for example, trimethyl aluminium, triethyl aluminium, triisopropyl aluminium, triisobutyl aluminium, ethyl aluminium sesquichloride, diethylaluminium chloride, ethyl aluminium dichloride, methylaluminoxane, modified methylaluminoxane, and borate.

As such, in the process of oligomerizing an ethylene monomer in the presence of a catalyst, a polymer such as polyethylene may be produced as a by-product during a catalytic reaction in addition to an oligomer product. The polymer is suspended in a liquid reaction medium in the reactor, causing a problem in that the polymer is accumulated in the reactor to a certain thickness due to a fouling phenomenon over time. In this case, it is necessary to shut down an operation of the reactor and wash the reactor and reactor auxiliary equipment.

Conventionally, a lot of time was taken in the process of dismantling the reactor and additional equipment, washing them for a long time, and then reinstalling them in order to wash the reactor fouled due to the polymer, causing a problem in that production is reduced and cleaning cost is increased when the operation is shut down, and reaction stability was deteriorated due to an increase in a reaction normalization time after washing.

On the other hand, the present invention provides a reactor cleaning method capable of washing the reactor fouled due to the polymer and the additional equipment in a short time by circulating a washing solvent between a washing solvent container in which the washing solvent is stored and the reactor, and at the same time, optimizing operating conditions and a washing method to improve a washing rate, and improving reaction stability by increasing production by reducing a shut down time, reducing washing costs, and shortening reaction normalization time after washing.

According to an embodiment of the present invention, the washing solvent may be used for washing the reactor 10. For example, the washing solvent may include one or more selected from the group consisting of n-pentane, n-hexane, n-heptane, n-decane, cyclohexane, methyl cyclohexane, benzene, xylene, toluene, ethylbenzene, chlorobenzene, dichlorobenzene, and trichlorobenzene. As a specific example, the washing solvent may be methyl cyclohexane, toluene, or n-decane.

The washing solvent may be input through a washing solvent supply line 21 of a washing solvent container 20, and the pump 30 and the heater 40 may be operated to heat the washing solvent. Specifically, the washing solvent supplied to the washing solvent container 20 is discharged through a lower discharge line L10 of the washing solvent container, and may be heated by being circulated through a heating circulation line L11 branched from the lower discharge line and connected to the washing solvent container 20. For example, the washing solvent stream is discharged through the heating circulation line L11, the washing solvent stream is circulated to the washing solvent container 20 using a pump 30, the washing solvent may be heated to a desired temperature by using a heater 40 provided in the heating circulation line L11, and the temperature of the heated washing solvent may be maintained.

The heating circulation line L11 may further include a first valve 50. The first valve 50 may be opened when heating the washing solvent stream and may be shut off when washing the reactor 10.

The temperature of the washing solvent stream heated while circulating the heating circulation line L11 may be 140° C. or higher, 150° C. or higher, or 160° C. or higher and 180° C. or lower, 190° C. or lower, or 200° C. or lower. When the reactor 10 is washed after heating the washing solvent within the above range, the fouled polymer is sufficiently swollen, and thus, may be easily eliminated through the circulation of the washing solvent.

According to an embodiment of the present invention, the washing solvent container 20 may be pressurized using pressurized gas supplied through a pressurized gas supply line 22. For example, the pressurized gas may include one or more selected from the group consisting of nitrogen and ethylene. As a specific example, the pressurized gas may be nitrogen or ethylene gas.

When the pressure of the washing solvent container 20 using the pressurized gas is less than 5 $kg/cm^2 \cdot g$, since the pressure of the washing solvent container becomes similar to the vapor pressure of the washing solvent, some of the washing solvent may be evaporated and loss of the washing solvent may be induced accordingly. As a result, there is a problem in that the washing effect is reduced, and economic feasibility is deteriorated due to the increase in period of shut down for replenishment of the reduced washing solvent.

Meanwhile, when the pressure of the washing solvent container 20 exceeds 40 $kg/cm^2 \cdot g$, there may be problems of economic feasibility (excessive equipment cost) and stability in handling pressurized gas due to the high pressure condition.

Considering the above considerations, the washing solvent container 20 may be pressurized in the range of 5 $kg/cm^2 \cdot g$ to 40 $kg/cm^2 \cdot g$, specifically 7 $kg/cm^2 \cdot g$ to 30 $kg/cm^2 \cdot g$ by using the pressurized gas. By pressurizing the pressure of the washing solvent container 20 within the above range, then it is possible to suppress the evaporation by performing the operation within the vapor pressure of the solvent and to help improve the washing power by increasing the solubility of ethylene in the solvent.

According to an embodiment of the present invention, the method may include supplying the washing solvent stream from the washing solvent container 20 to any one or more of the lower portion or the side portion of the reactor 10 to fill the inside of the reactor 10. Specifically, the heated washing solvent stream may be discharged through the lower discharge line of the washing solvent container 20 pressurized through the pressurized gas and supplied to the reactor 10.

The lower discharge line L10 of the washing solvent container may be branched into the heating circulation line L11 and the washing circulation line L12 described above, and the heated washing solvent stream discharged after pressurizing the washing solvent container 20 using pressurized gas may be supplied to the reactor 10 through the washing circulation line L12. In this case, the washing circulation line L12 may collectively mean a line connected from the lower discharge line L10 of the washing solvent container to the reactor 10, and a line connected from the upper discharge line of the reactor 10 to the washing solvent container 20.

A second valve 51 may be further provided in the washing circulation line L12 adjacent to the lower discharge line L10 of the washing solvent container. The second valve 51 may be shut off when heating the washing solvent stream and may be opened when washing the reactor 10.

The washing solvent stream discharged from the washing solvent container 20 may be supplied to the lower portion of the reactor 10, supplied to the side portion of the reactor, or simultaneously supplied to the lower portion and side portion of the reactor. In this case, the lower portion of the reactor 10 may mean a lower end of the reactor 10, and the side portion of the reactor 10 may mean 5% or more, 6% or more, 7% or more, 8% or more or 9% or more and 10% or less, 11% or less, 13% or less, 15% or less, or 20% or less of the total height of the reactor 10 when the lower end of the reactor 10 is 1% and the upper end of the reactor is 100%. When the washing solvent is supplied to the side portion of the reactor 10 in the above range, the washing power of the polymer accumulated on a wall surface of the reactor 10 and additional equipment such as a sensor may be improved.

Specifically, even when the washing solvent stream discharged from the washing solvent container 20 is supplied to the lower portion and the side portion of the reactor 10, respectively, the washing of the reactor 10 may be made smoothly, and when the washing solvent stream is simultaneously supplied to the lower portion and side portion of the reactor 10, the flow direction of the washing solvent in the reactor 10 may be continuously changed to improve the washing power of the polymer accumulated in the additional equipment such as the sensor installed inside the reactor 10 together with the lower portion and the wall surface of the reactor 10.

According to an embodiment of the present invention, the method may include filling the reactor 10 with the washing solvent, and then circulating the washing solvent stream between the washing solvent container 20 and the reactor 10. In this case, the temperature of the reactor 10 may be maintained at 115° C. or more, 120° C. or more, 130° C. or more, 140° C. or more, 150° C. or more, 160° C. or more and 180° C. or less, 190° C. or less or 200° C. or less. When the washing solvent stream is circulated, by controlling the temperature of the reactor 10 in the above range, the polymer accumulated in the reactor 10 may be sufficiently swollen to facilitate removal.

In the step of circulating the washing solvent stream, the circulation time may be 12 hours or more, 15 hours or more, 20 hours or more and 24 hours or less, 26 hours or less, or 28 hours or less. In addition, in the step of circulating the washing solvent stream, the circulation flow rate may be 50 kg/hr or more, 80 kg/hr or more or 100 kg/hr or more and 300 kg/hr or less, 350 kg/hr or less, or 400 kg/hr or less. When the washing solvent stream is circulated, the washing rate of the polymer accumulated in the reactor 10 may be improved by satisfying the above conditions.

According to the embodiment of the present invention, methyl cyclohexane may be used as the washing solvent, and nitrogen or ethylene gas may be used as the pressurized gas. Specifically, when methyl cyclohexane is used as a washing solvent for circulating the reactor 10 and the washing solvent container 20, nitrogen or ethylene gas may be used as a pressurized gas for pressurizing the washing solvent container 20.

In this case, considering that the vapor pressure of the methyl cyclohexane within the range of 140° C. to 200° C. is approximately 3.1 kg/cm$^2$·g, the washing solvent container 20 may be pressurized in the range of 5 kg/cm$^2$·g to 40 kg/cm$^2$·g, specifically, and 7 kg/cm$^2$·g to 30 kg/cm$^2$·g by using nitrogen or ethylene gas which is the pressurized gas. For example, when the washing solvent container 20 is pressurized at a pressure lower than 5 kg/cm$^2$·g, the loss of methyl cyclohexane is increased as the methyl cyclohexane is evaporated and is lost together with the pressurized gas, so the washing efficiency is reduced. Furthermore, in order to maintain the washing solvent container 20 at a pressure higher than 40 kg/cm$^2$·g, economic efficiency (excessive equipment cost) may be reduced, and a problem regarding stability may occur in handling the pressurized gas.

In addition, when the methyl cyclohexane is used as the washing solvent and the nitrogen or ethylene gas is used as the pressurized gas, the temperature of the reactor 10 during circulation of the washing solvent stream is 130° C. or higher, 140° C. or higher, 150° C. or higher or 160° C. or higher, and 180° C. or lower or 190° C. or lower.

In addition, when the methyl cyclohexane is used as the washing solvent and the nitrogen gas is used as the pressurized gas, the pressure of the washing solvent container 20 pressurized using the pressurized gas may be 5 kg/cm$^2$·g or more or 6 kg/cm$^2$·g or more and 8 kg/cm$^2$·g or less, 9 kg/cm$^2$·g or less, or 10 kg/cm$^2$·g or less. In addition, when the methyl cyclohexane is used as the washing solvent and the ethylene gas is used as the pressurized gas, the pressure of the washing solvent container 20 pressurized using the pressurized gas may be 7 kg/cm$^2$·g or more, 10 kg/cm$^2$·g or more, 20 kg/cm$^2$·g or more or 25 kg/cm$^2$·g or more and 30 kg/cm$^2$·g or less, or 40 kg/cm$^2$·g or less.

As described above, by controlling the type of washing solvent, the type of pressurized gas, the degree of pressurization, the temperature of the reactor 10, etc., it is possible to improve the washing rate by satisfying the optimal conditions for washing the polymer accumulated in the reactor 10.

According to the embodiment of the present invention, the toluene or n-decane may be used as the washing solvent, and the nitrogen gas may be used as the pressurized gas. Specifically, when the toluene or n-decane is used as the washing solvent for circulating the reactor 10 and the washing solvent container 20, the nitrogen gas may be used as the pressurized gas for pressurizing the washing solvent container 20.

In addition, when the toluene or n-decane is used as the washing solvent and the nitrogen gas is used as the pressurized gas, the temperature of the reactor 10 during the circulation of the washing solvent stream is 140° C. or higher or 150° C. or higher, and 170° C. or lower or 180° C. or lower.

In addition, when the toluene or n-decane is used as the washing solvent and the nitrogen gas is used as the pressurized gas, the pressure of the washing solvent container 20 pressurized using the pressurized gas may be 5 kg/cm$^2$·g or more or 6 kg/cm$^2$·g or more and 8 kg/cm$^2$·g or less, 9 kg/cm$^2$·g or less, or 10 kg/cm$^2$·g or less.

As described above, by controlling the type of washing solvent, the type of pressurized gas, the degree of pressurization, the temperature of the reactor 10, etc., it is possible to improve the washing rate by satisfying the optimal conditions for washing the polymer accumulated in the reactor 10.

Hereinabove, the reactor cleaning method according to the present invention has been illustrated in the description and drawings, but the above drawings and the description describe and illustrate only the essential components for understanding the present invention. In addition to the processes and apparatus illustrated in the above description and drawings, processes and apparatus not separately described and shown may be appropriately applied and used to implement the reactor cleaning method according to the present invention.

Hereinafter, the present invention will be described in more detail with through Examples. However, the following examples are for illustrating the present invention, and it is clear to those skilled in the art that various changes and modifications are possible within the scope and spirit of the present invention, and the scope of the present invention is not limited only thereto.

EXAMPLES

Example 1

A reactor 10 was washed according to a process flow diagram illustrated in FIG. 1 below.

Specifically, an oligomerization reaction of ethylene was performed in the reactor 10, and after the reaction was completed, a reaction solution was transferred to a storage container, and a polymer adhering in the reactor 10 was washed. In this case, even in Examples 2 to 9 and Comparative Examples 1 to 4, a pre-washing step was performed in the same manner.

350 kg of methyl cyclohexane as a washing solvent was input through a washing solvent supply line 21 of a washing solvent container 20, heated while being circulated through a heating circulation line L11 using a pump 30 and a heater 40, and maintained at 170° C. In addition, the nitrogen gas as the pressurized gas was input through a pressurized gas supply line 22 of the washing solvent container 20, and the washing solvent container 20 was pressurized at 7 kg/cm$^2$·g.

Then, after the washing solvent stream was discharged to a lower discharge line L10 of the washing solvent container, input to the lower portion of the reactor 10, and filled to an upper end of the reactor 10, a temperature of the reactor 10 was maintained at 160° C. and the washing solvent was circulated through a washing circulation line L12 for 24 hours while a flow rate of the washing solvent was controlled to 100 kg/hr to 200 kg/hr.

Then, the washing solvent collected in the washing solvent container 20 was sampled and filtered and was vacuum dried, and then the weight of the polymer was measured. This was performed under the same conditions in Examples 2 to 9 and Comparative Examples 1 to 4, and it was confirmed that the polymer washing rate was 60.54% in conversion based on the polymer weight of Example 7 in which the weight of the polymer was measured the highest.

Example 2

A reactor 10 was washed according to a process flow diagram illustrated in FIG. 2 below.

350 kg of methyl cyclohexane as a washing solvent was input through a washing solvent supply line 21 of the washing solvent container 20, heated while being circulated through a heating circulation line L11 using a pump 30 and a heater 40, and maintained at 170° C. In addition, the nitrogen gas as the pressurized gas was input through a pressurized gas supply line 22 of the washing solvent container 20, and the washing solvent container 20 was pressurized at 7 kg/cm$^2$·g.

Then, after the washing solvent stream was discharged to a lower discharge line L10 of the washing solvent container, input to a position of 10% of the total height of the reactor 10, and filled to an upper end of the reactor 10, a temperature of the reactor 10 was maintained at 160° C. and the washing solvent was circulated through a washing circulation line L12 for 24 hours while the flow rate of the washing solvent was controlled to 200 kg/hr.

Thereafter, after the washing solvent collected in the washing solvent container 20 was sampled, and filtered and vacuum dried, a weight of the polymer was measured, and it was confirmed that the polymer washing rate was 66.49% in conversion based on 100% of the weight of the polymer measured in Example 7 below.

Example 3

A reactor 10 was washed according to a process flow diagram illustrated in FIG. 3 below.

350 kg of methyl cyclohexane as a washing solvent was input through a washing solvent supply line 21 of a washing solvent container 20, heated while being circulated through a heating circulation line L11 using a pump 30 and a heater 40, and maintained at 170° C. In addition, the nitrogen gas as the pressurized gas was input through a pressurized gas supply line 22 of the washing solvent container 20, and the washing solvent container 20 was pressurized at 7 kg/cm$^2$·g.

Then, after the washing solvent stream was discharged to a lower discharge line L10 of the washing solvent container, simultaneously input to a lower portion of the reactor 10 and a position of 10% of the total height of the reactor 10, and filled to an upper end of the reactor 10, a temperature of the reactor 10 was maintained at 130° C. and the washing solvent was circulated through a washing circulation line L12 for 24 hours while the flow rate of the washing solvent was controlled to 200 kg/hr.

Thereafter, after the washing solvent collected in the washing solvent container 20 was sampled, and filtered and vacuum dried, a weight of the polymer was measured, and it was confirmed that the polymer washing rate was 87.03% in conversion based on 100% of the weight of the polymer measured in Example 7 below.

Example 4

Example 4 was performed in the same manner as the above Example 3 except that, a washing solvent stream was filled to an upper end of the reactor 10, and then, a temperature of the reactor 10 was maintained at 160° C.

Thereafter, after the washing solvent collected in the washing solvent container 20 was sampled, and filtered and vacuum dried, a weight of the polymer was measured, and it was confirmed that the polymer washing rate was 94.05% in conversion based on 100% of the weight of the polymer measured in Example 7 below.

Example 5

Example 5 was performed in the same manner as the above Example 3 except that, a washing solvent stream was filled to an upper end of the reactor 10, and then, a temperature of the reactor 10 was maintained at 180° C.

Thereafter, after the washing solvent collected in the washing solvent container 20 was sampled, and filtered and vacuum dried, a weight of the polymer was measured, and it was confirmed that the polymer washing rate was 97.30% in conversion based on 100% of the weight of the polymer measured in Example 7 below.

Example 6

Example 6 was performed in the same manner as the above Example 4 except that, ethylene gas was used instead of nitrogen gas as a pressurized gas.

Thereafter, after the washing solvent collected in the washing solvent container 20 was sampled, and filtered and vacuum dried, a weight of the polymer was measured, and it was confirmed that the polymer washing rate was 97.84% in conversion based on 100% of the weight of the polymer measured in Example 7 below.

Example 7

Example 7 was performed in the same manner as the above Example 6 except that, pressurized gas was input to pressurize a washing solvent container 20 at 30 kg/cm$^2$·g.

Thereafter, after a washing solvent collected in the washing solvent container 20 was sampled, and filtered and vacuum dried, a weight of the polymer was measured, and the weight of the measured polymer was measured as 1.85 kg which is the highest, and was set as 100%.

Example 8

Example 8 was performed in the same manner as the above Example 4 except that, toluene was used instead of methyl cyclohexane as a washing solvent.

Thereafter, after the washing solvent collected in the washing solvent container 20 was sampled, and filtered and vacuum dried, a weight of the polymer was measured, and it was confirmed that the polymer washing rate was 97.84% in conversion based on 100% of the weight of the polymer measured in the above Example 7.

Example 9

Example 9 was performed in the same manner as the above Example 4 except that, n-decane was used instead of methyl cyclohexane as a washing solvent.

Thereafter, after the washing solvent collected in the washing solvent container 20 was sampled, and filtered and vacuum dried, a weight of the polymer was measured, and it was confirmed that the polymer washing rate was 98.92% in conversion based on 100% of the weight of the polymer measured in the above Example 7.

COMPARATIVE EXAMPLES

Comparative Example 1

Figure 4:
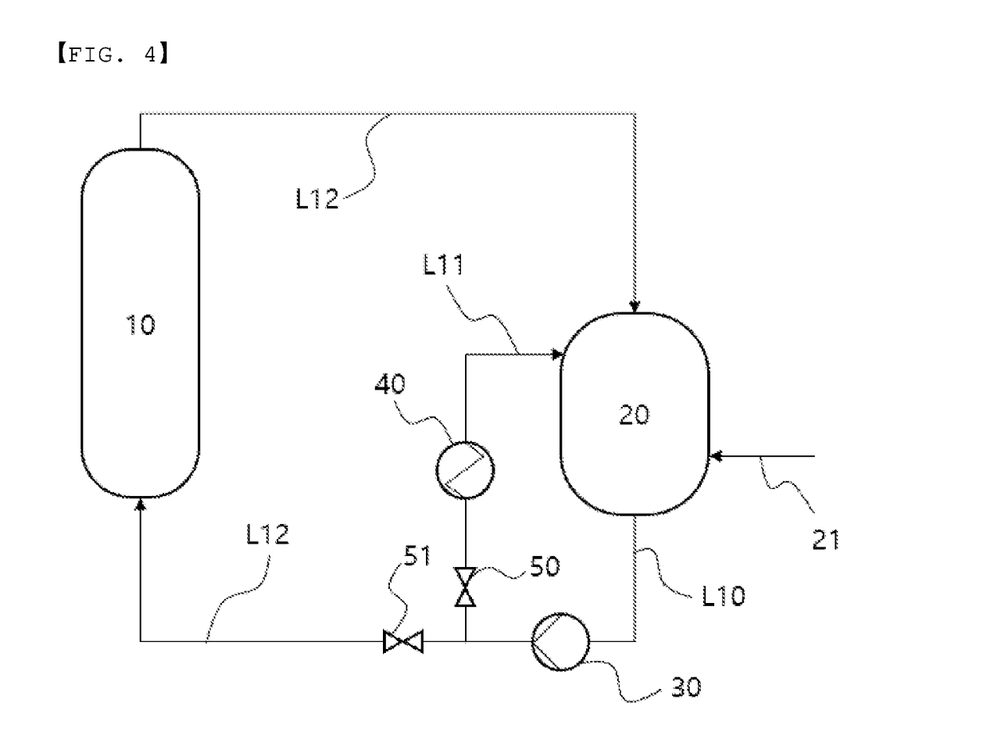
FIGS. 4 and 5 are process flow diagrams of a reactor cleaning method according to a comparative example, respectively.

A reactor 10 was washed according to a process flow diagram illustrated in FIG. 4 below.

350 kg of methyl cyclohexane as a washing solvent was input through a washing solvent supply line 21 of a washing solvent container 20, heated while being circulated through a heating circulation line L11 using a pump 30 and a heater 40, and maintained at 170° C.

Then, after the washing solvent stream was discharged to a lower discharge line L10 of the washing solvent container, input to a lower portion of the reactor 10, and filled to an upper end of the reactor 10, a temperature of the reactor 10 was maintained at 100° C. and the washing solvent was circulated through a washing circulation line L12 for 24 hours while the flow rate of the washing solvent was controlled to 200 kg/hr. In this case, it was confirmed that a vapor pressure of methyl cyclohexane was 0 kg/cm$^2$·g.

Thereafter, after the washing solvent collected in the washing solvent container 20 was sampled, and filtered and vacuum dried, a weight of the polymer was measured, and it was confirmed that the polymer washing rate was 16.76% in conversion based on 100% of the weight of the polymer measured in the above Example 7.

Comparative Example 2

Comparative Example 2 was performed in the same manner as the above Example 3 except that, a washing solvent stream was filled to an upper end of the reactor 10, and then, a temperature of the reactor 10 was maintained at 100° C.

Thereafter, after the washing solvent collected in the washing solvent container 20 was sampled, and filtered and vacuum dried, a weight of the polymer was measured, and it was confirmed that the polymer washing rate was 22.70% in conversion based on 100% of the weight of the polymer measured in Example 7 below.

Comparative Example 3

A reactor 10 was washed according to a process flow diagram illustrated in FIG. 4 below.

350 kg of methyl cyclohexane as a washing solvent was input through a washing solvent supply line 21 of a washing solvent container 20, heated while being circulated through a heating circulation line L11 using a pump 30 and a heater 40, and maintained at 170° C.

Then, after the washing solvent stream was discharged to a lower discharge line L10 of the washing solvent container, input to a lower portion of the reactor 10, and filled to an upper end of the reactor 10, a temperature of the reactor 10 was maintained at 160° C. and the washing solvent was circulated through a washing circulation line L12 for 24 hours while the flow rate of the washing solvent was controlled to 200 kg/hr. In this case, it was confirmed that a vapor pressure of methyl cyclohexane was 3.1 kg/cm$^2$·g.

Thereafter, after the washing solvent collected in the washing solvent container 20 was sampled, and filtered and vacuum dried, a weight of the polymer was measured, and it was confirmed that the polymer washing rate was 34.05% in conversion based on 100% of the weight of the polymer measured in the Example 7 above.

Comparative Example 4

Figure 5:
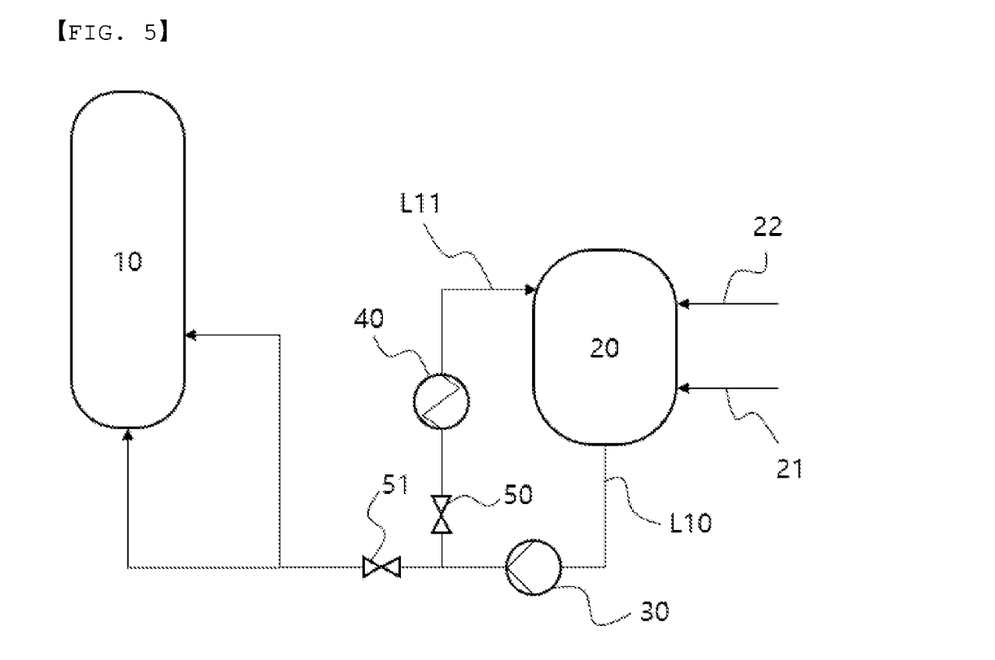

A reactor 10 was washed according to a process flow diagram illustrated in FIG. 5 below.

350 kg of methyl cyclohexane as a washing solvent was input through a washing solvent supply line 21 of a washing solvent container 20, heated while being circulated through a heating circulation line L11 using a pump 30 and a heater 40, and maintained at 170° C. In addition, the nitrogen gas as the pressurized gas was input through a pressurized gas supply line 22 of the washing solvent container 20, and the washing solvent container 20 was pressurized at 7 kg/cm$^2$·g.

Then, after the washing solvent stream was discharged to a lower discharge line L10 of the washing solvent container, simultaneously input to a lower portion of the reactor 10 and a position of 10% of the total height of the reactor 10, and filled to an upper end of the reactor 10, a temperature of the reactor 10 was maintained at 160° C., and the washing solvent was stored in the reactor 10 for 24 hours.

Thereafter, after the washing solvent in the reactor 10 was sampled and filtered and vacuum dried, a weight of a polymer was measured, and it was confirmed that the polymer washing rate was 50.81% in conversion based on 100% of the weight of the polymer measured in Example 7 above.

The invention claimed is:

1. A method for cleaning a reactor, the method comprising:
pressurizing a washing solvent container to 5 kg/cm$^2$ (gauge) to 40 kg/cm$^2$ (gauge) using a pressurized gas;
supplying a washing solvent stream including a washing solvent from the washing solvent container to the reactor simultaneously through a first washing circulation line connected to a lower end of the reactor and a second washing circulation line connected to a side portion of the reactor;
filling the reactor with the washing solvent; and
circulating the washing solvent stream between the washing solvent container and the reactor while maintaining a temperature of the reactor at 115° C. to 200° C.

2. The method of claim 1, wherein the washing solvent includes n-pentane, n-hexane, n-heptane, n-decane, cyclohexane, methyl cyclohexane, benzene, xylene, toluene, ethylbenzene, chlorobenzene, dichlorobenzene, trichlorobenzene or a combination thereof.

3. The method of claim 1, wherein the pressurized gas contains nitrogen ethylene or a combination thereof.

4. The method of claim 1, wherein the washing solvent is methyl cyclohexane, and the pressurized gas is nitrogen or ethylene.

5. The method of claim 1, wherein the washing solvent is toluene or n-decane, and the pressurized gas is nitrogen.

6. The method of claim 1, wherein a temperature of the washing solvent in the washing solvent container is 140° C. to 200° C.

7. The method of claim 1, wherein the washing solvent container is pressurized to 7 kg/cm$^2$ (gauge) to 30 kg/cm$^2$ (gauge) using the pressurized gas.

8. The method of claim 1, wherein the temperature of the reactor is maintained at 130° C. to 180° C.

9. The method of claim 1, wherein the side portion of the reactor is a position of 5% to 20% of a total height of the reactor, when a bottom of the reactor is defined as 0% of the total height of the reactor and a top of the reactor is defined as 100% of the total height of the reactor.

10. The method of claim 1, wherein the reactor is an oligomerization reactor of ethylene.

11. The method of claim 1, wherein circulating of the washing solvent stream is performed at a flow rate of 50 kg/hour to 400 kg/hour.

12. The method of claim 1, wherein the washing solvent container is pressurized to 10 kg/cm$^2$ (gauge) to 30 kg/cm$^2$ (gauge) using the pressurized gas.

* * * * *